United States Patent [19]

Naitoh

[11] Patent Number: 5,177,799
[45] Date of Patent: Jan. 5, 1993

[54] SPEECH ENCODER

[75] Inventor: Masashi Naitoh, Sendai, Japan

[73] Assignee: Kokusai Electric Co., Ltd., Tokyo, Japan

[21] Appl. No.: 721,986

[22] Filed: Jun. 27, 1991

[30] Foreign Application Priority Data

Jul. 3, 1990 [JP] Japan .................................. 2-175642

[51] Int. Cl.⁵ .............................................. G10L 5/00
[52] U.S. Cl. ........................................ 381/34; 381/35; 381/45
[58] Field of Search ................................ 381/29–45; 395/2

[56] References Cited

U.S. PATENT DOCUMENTS 4,227,176 10/1980 Moshier .................................. 395/2
4,991,213 2/1991 Wilson .................................. 381/34

Primary Examiner—Emanuel S. Kemeny
Attorney, Agent, or Firm—Emmanuel J. Lobato; Robert E. Burns

[57] ABSTRACT

A speech encoder is disclosed, in which, of the DCT coefficients after the discrete cosine transformation, a coefficient which has a large absolute value and exerts great influence on the tone quality is selected and encoded and zeros are inserted into the other unselected coefficients, so that selective encoding is carried out which does not seriously deteriorate the tone quality even when the coding rate is 8 kbps or below. In another arrangement, about three to 16 different selection patterns (vector patterns per frame) are used for the selective coding and a pattern which minimizes the coding error is selected and encoded to ensure optimum coding.

2 Claims, 4 Drawing Sheets

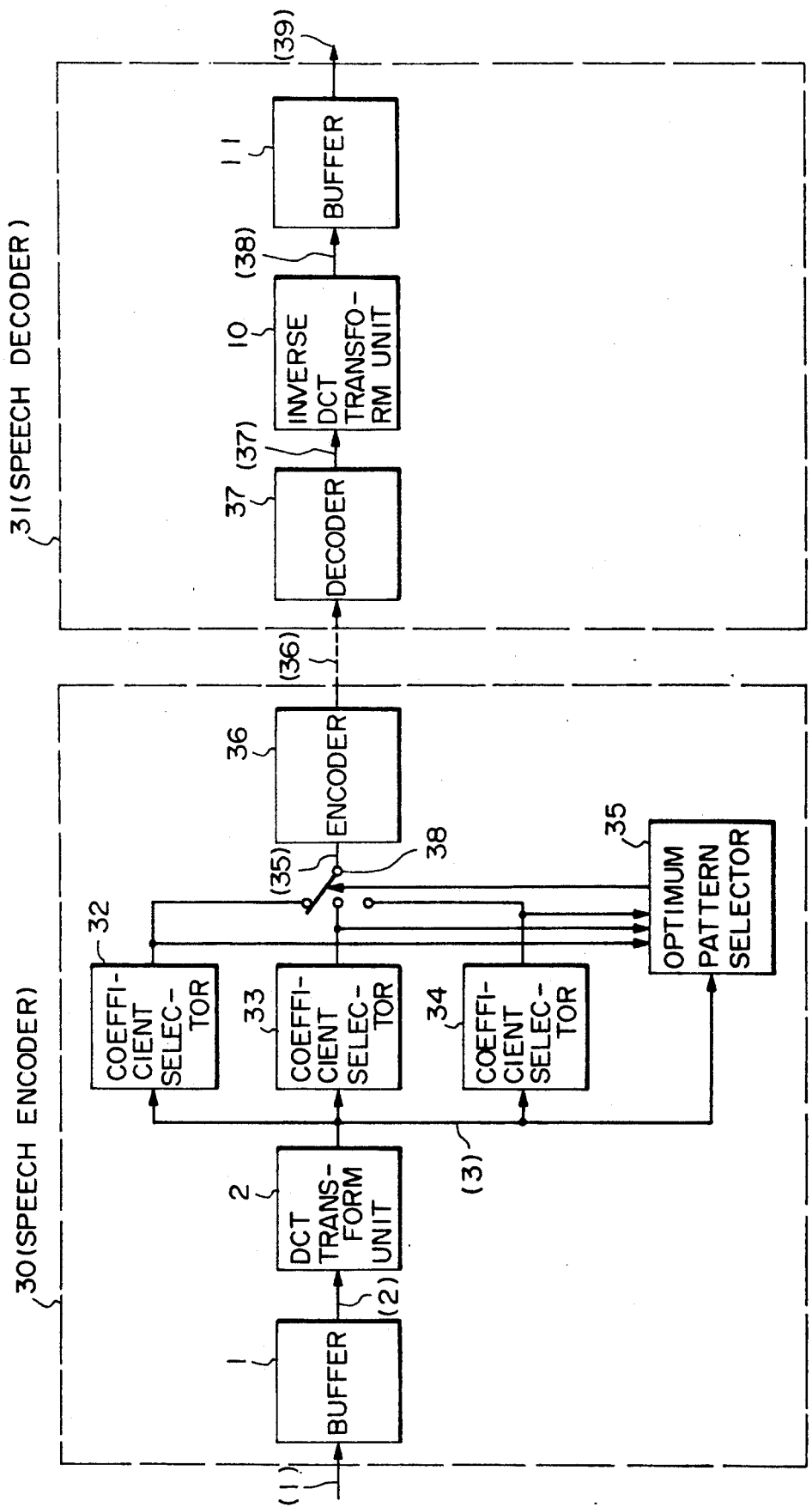

SPEECH ENCODER

BACKGROUND OF THE INVENTION

The present invention relates to a speech encoder for use in a speech waveform coding system which is one of speech signal coding systems and, more particularly, to a speech encoder for use in an adaptive transform coding (hereinafter referred to simply as ATC) system.

There have been proposed some types of speech encoders. However, they have such defected as low tone quality at a coding rate of 8 kbps, necessity of a large scale of memory.

SUMMARY OF THE INVENTION

An object of the present invention is to provide a speech encoder which obviates the defects of the above-mentioned two conventional systems and which permits reproduction of a speech of excellent tone quality even when the coding rate is 8 kbps or below and which neither calls for a large capacity memory such as a code book nor needs a large amount of processing time.

The speech encoder of the present invention comprises an arrangement in which, of the DCT coefficients after the discrete cosine transformation, a coefficient which has a large absolute value and exerts great influence on the tone quality is selected and encoded and zeros are inserted into the other unselected coefficients, whereby selective encoding is carried out which does not seriously deteriorate the tone quality even when the coding rate is 8 kbps or below.

Furthermore, the speech encoder of the present invention comprises an arrangement in which about three to 16 different selection patterns (vector patterns per frame) are used for the selective coding and a pattern which minimizes the coding error is selected and encoded to ensure optimum coding.

More specifically, the speech encoder of the present invention which is of the adaptive transform coding system in which an analog speech signal is adaptively encoded through a block-by-block orthogonal transformation to frequency regions by a discrete cosine transform unit, comprises: at least three coefficient selectors which are supplied with discrete cosine transform coefficients from the discrete cosine transform unit and perform coefficient selection processing following different coefficient selection patterns for each frame; a switch for selectively outputting any one of the outputs from the at least three coefficient selectors; an optimum pattern selector which compares the outputs from the at least three coefficient selectors and the output of the discrete cosine transform unit and controls the switch to select the output of said one of the coefficient selectors which outputs a vector pattern to minimize a quantizing error; and an encoder for encoding the output of the switch by adaptive transform coding.

BRIEF DESCRIPTION OF THE DRAWINGS

The present invention will be described in detail below in comparison with prior art with reference to accompanying drawings, in which:

FIG. 3 is a block diagram illustrating an embodiment of the present invention.

DETAILED DESCRIPTION

To make differences between prior art and the present invention clear, examples of prior art will first be described.

Figure 1:
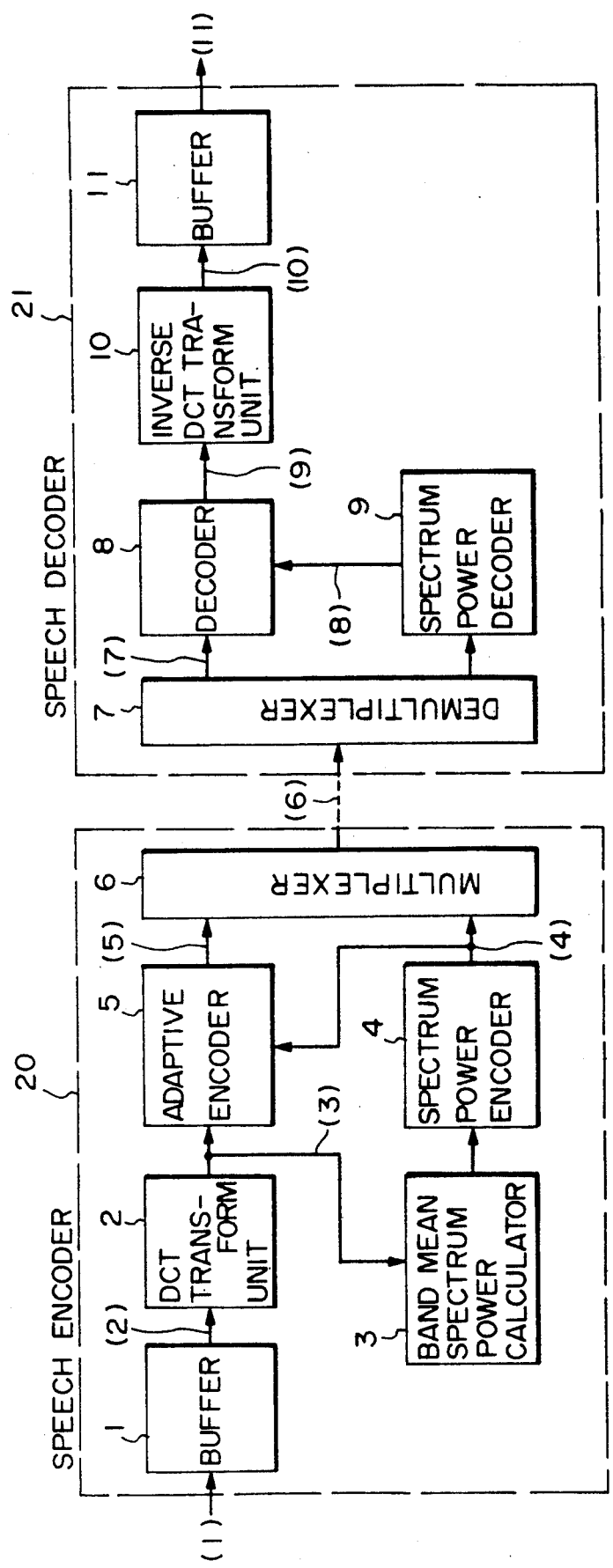
FIGS. 1 and 2 are block diagram showing prior art examples.
Figure 2:
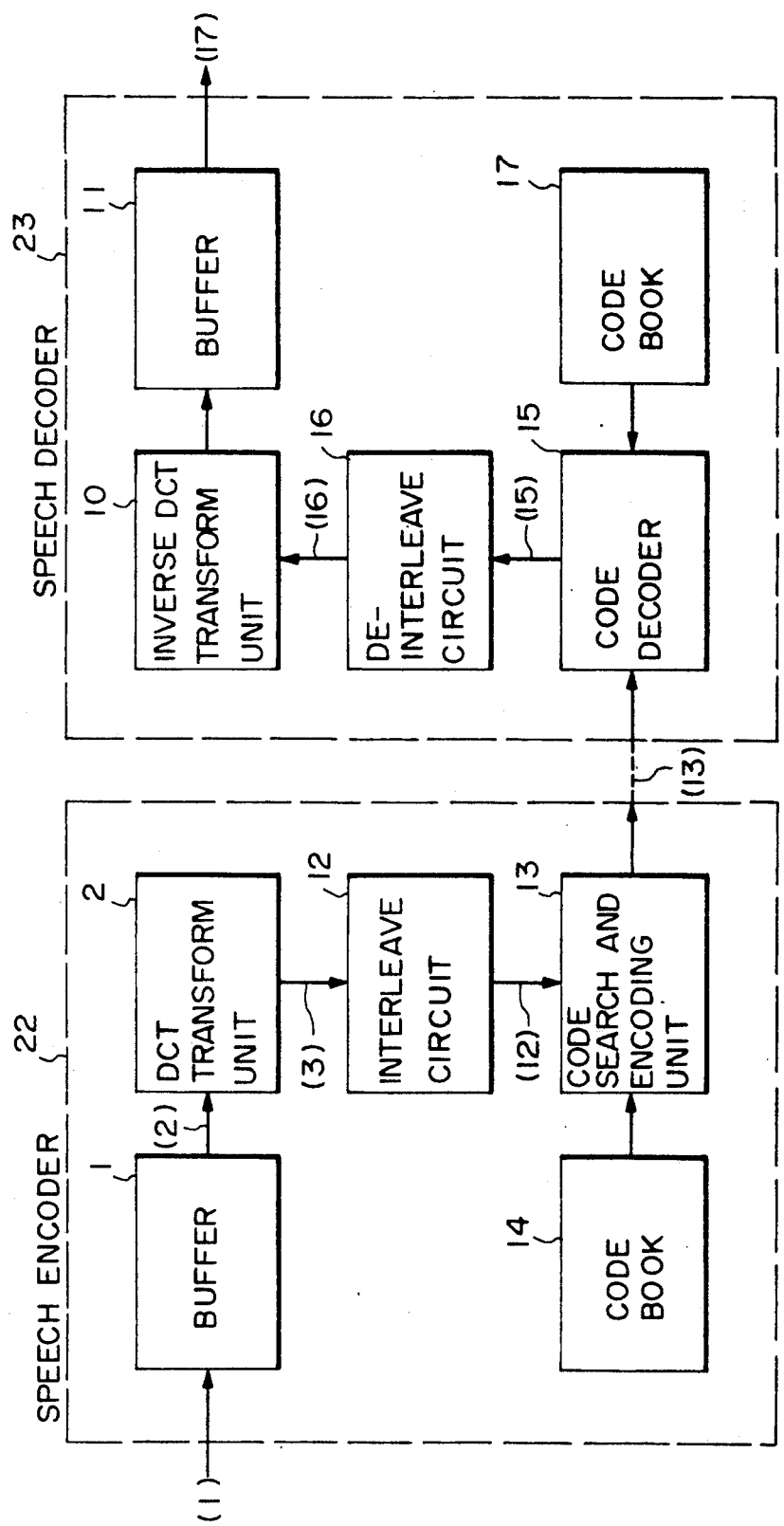

FIGS. 1 and 2 are block diagrams showing examples of an encoder and a decoder heretofore employed in the ATC system. In FIG. 1, reference numeral 20 indicates a speech encoder and 21 a speech decoder.

In the speech encoder 20, (1) denotes an analog input speech signal and (2) a signal of each of predetermined blocks (hereinafter referred to as frames) into which the analog speech signal (1) has been divided by a buffer 1. The signal (2) of each frame is subjected to a discrete cosine transformation by a DCT (Discrete Cosine Transform) unit 2 to obtain a DCT coefficient (3). The DCT coefficient (3) is provided to a mean bad spectrum power calculator 4, wherein a mean spectrum power is calculated for each of eight frequency bands or so. The mean spectrum power of each band is encoded by a spectrum power encoder 4 to obtain a signal (4).

On the other hand, an adaptive encoder 5 adaptively encodes, under consideration of the information (4) from the spectrum power calculator 4, the DCT coefficient (3) to reduce an encoding error, thereby obtaining encoded DCT coefficient information (5). These pieces of encoded information (4) and (5) are multiplexed by a multiplexer (MUX) 6, from which digital data (6) is output.

The digital data (6) received by the speech decoder 21 is demultiplexed by a demultiplexer (DMUX) 7 to obtain the encoded DCT coefficient information (7), which is decoded by a decoder 8 into the DCT coefficient (9), based on the encoded spectrum power information (8) available from a spectrum power decoder 9. The DCT coefficient thus obtained is subjected to an inverse discrete cosine transformation by an inverse DCT unit 10 to obtain a synthesized speech (10) for each frame, which is provided to a buffer 11 to restore a synthetic speech (11).

FIG. 2 shows another prior art example, in which reference numeral 22 indicates a speech encoder and 23 a speech decoder. In the speech encoder 22, the DCT coefficients (3) obtained in the same manner as in FIG. 1 are interleaved by an interleave circuit 12 in accordance with certain rules so that sequences of coefficients become just like random noise, obtaining information (12). Next, in a code search and encoding unit 13 a code most approximate to the information (12) is searched from a code book 14 having stored therein various sequences of noise, and its code number is transmitted, as digital data (13), to the speech decoder 23.

The digital data (13) received by the speech decoder 23 is applied to a code decoder 15, wherein the same code (15) as the digital data (13) is selected from a code book 17 having stored therein the same codes as those of the code book 14. Next, the code (15) is provided to a de-interleave circuit 16, wherein it is subjected to processing reverse from that by the interleave circuit 12, thereby decoding quantized DCT coefficients (16). The DCT coefficients (16) thus decoded are subjected to an inverse discrete cosine transformation by an inverse DCT unit 10, the output of which is applied to the buffer 11 to obtain a synthetic speech (17).

The prior art examples depicted in FIGS. 1 and 2 have such shortcomings as mentioned below.

With the construction of FIG. 1, a high quality speech can be reproduced when the coding rate is 16 kbps or so, but the tone quality is seriously deteriorated when the coding rate is 8 kbps or below.

With the construction of FIG. 2, a speech of excellent tone quality can be reproduced even if the coding rate is 8 kbps or below, but a storage capacity of 5 kilobytes is needed for the code books 14 and 17 and much processing time is necessary for searching an optimum code from all codes stored therein.

This calls for a large amount of hardware, inevitably resulting a large-scale circuit structure.

With reference to the accompanying drawings, the present invention will hereinafter be described in detail.

FIG. 3 is a block diagram illustrating the circuit construction of an embodiment of the speech encoder according to the present invention. FIG. 4 shows examples of selection patterns (vector patterns for each frame) in the embodiment of FIG. 3. This embodiment will be described in connection with a case of using three kinds of patterns.

In FIG. 3, reference numeral 30 denotes a speech encoder and 31 a speech decoder. An input signal (2) divided by a buffer 1 into predetermined frames is subjected to DCT processing to obtain DCT coefficients (3). The DCT coefficients (3) are input into coefficient selectors 32 to 34, wherein three kinds of selection processes (i.e. coefficient select processing) are performed, and the outputs are provided to an optimum pattern selector 35 and a switch 38. The optimum pattern selector 35 compares the outputs of the coefficient selectors with the DCT coefficients (3) and selects that one of them which minimizes a quantizing error by selection, and then it controls the switch 38 to obtain the selected output (35). An encoder 36 uses the output (35) from the switch 38 to perform encoding and transmits positional information and encoded information of the coefficient as digital data (36).

In the speech decoder 31 the DCT coefficient is decoded by a decoder 37 from the digital data (36) input thereinto and zeros are inserted into the untransmitted coefficients to obtain all DCT coefficients (37). The DCT coefficients thus obtained are subjected to an inverse transformation by an inverse DCT unit 10 to obtain a synthetic speech (38), which is output as a reproduced speech (39) via a buffer 11.

Figure 4A:
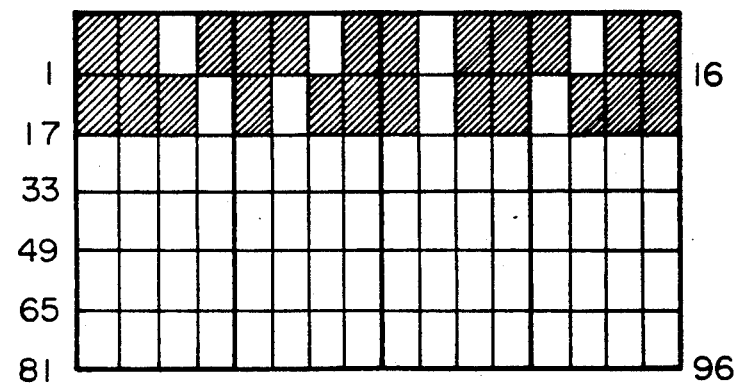
FIGS. 4A, 4B and 4C show patterns for selection processing in FIG. 3.
Figure 4B:
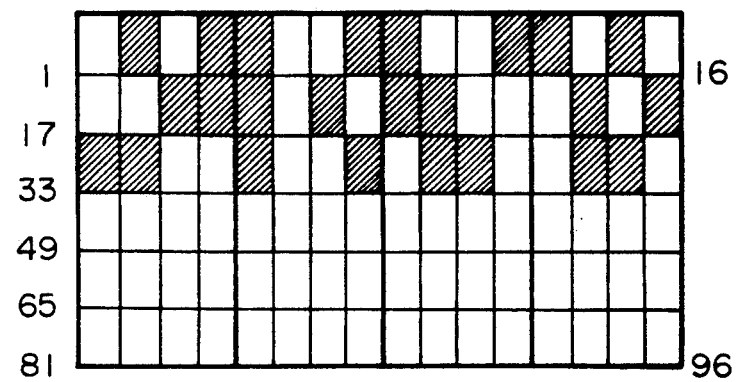
Figure 4C:
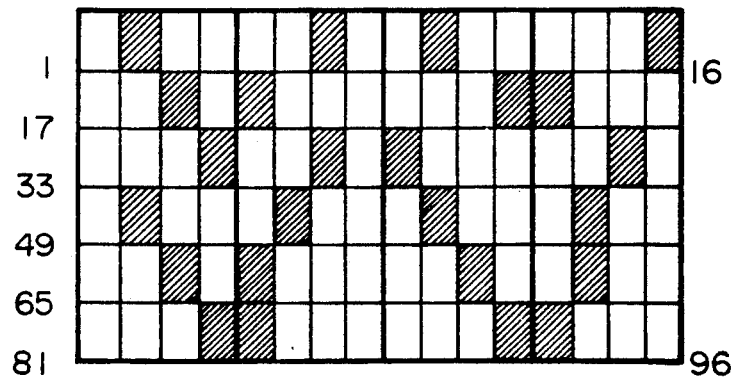

FIGS. 4A to 4C show examples of vector patterns (patterns for the selection processing) per frame in the coefficient selectors 32 to 34 depicted in FIG. 3. FIGS. 4A to 4C each illustrate a case where one frame is composed of 96 samples and 24 coefficients are selected from 96 DCT coefficients. The hatched portions indicate coefficients to be selected and encoded. In FIGS. 4A to 4C, all the coefficients from 1 to 96 are arranged in ascending order of frequencies and are grouped into 24 areas each composed of four coefficients, and the coefficients are selected in units of 24 areas. Now, FIGS. 4A to 4C will be described.

FIG. 4A shows a selection pattern of the coefficient selector 32, in which three coefficients of larger absolute values are selected in each of eight areas of lower frequencies, that is, a total of 24 coefficients are selected.

FIG. 4B shows a selection pattern of the coefficient selector 33, in which two coefficients of larger absolute values are selected in each of 12 areas of lower frequencies, that is, a total of 24 coefficients are selected.

FIG. 4C shows a selection pattern of the coefficient selector 34, in which only one coefficients of the largest absolute value is selected in each of all the 24 areas.

These selection patterns of FIGS. 4A to 4C correspond to the following selection of the DCT coefficients according to features of the speech being transmitted. The selection pattern of FIG. 4A is a pattern in which energies are centralized in the low frequency region as in the case of a vowel, and encoding of this pattern is called centralized encoding. The selection pattern of FIG. 4C is a pattern in which energies are decentralized over a wide frequency range, and encoding of this pattern is called decentralized encoding. The selection pattern of FIG. 4B is intermediate between the both of them of FIG. 4A and FIG. 4C, and encoding of this pattern is called intermediate encoding.

It is evident that this selection processing affords reduction of quantizing errors, because four coefficients in each area are selected in descending order of their absolute values. Accordingly, that one of the patterns of FIG. 4A to FIG. 4C which minimized an error by selection is selectively output by the optimum pattern selector 35 and the switch 38, and this permits the reproduction of excellent tone quality even if the coding rate is 8 kbps or lower.

Although the above embodiment has been described in connection with a case where the three coefficient selector 32 to 34 are provided, the invention is also applicable to a case where three to 16 kinds of selection patterns are employed.

As described above in detail, the present invention permits the implementation of a speech encoder which reduces deterioration of the tone quality even if the coding rate is 8 kbps or below, dispenses with such a large capacity memory as a code book and requires less processing time. Hence, the invention is of great utility.

What I claim is:

1. A speech encoder of an adaptive transform coding system which adaptively encodes an analog speech signal through a block-by-block orthogonal transformation to frequency regions by a discrete cosine transform unit, comprising:
    a coefficient selector supplied with discrete cosine transform coefficients from said discrete cosine transform unit and selectively outputs a predetermined number of them in descending order of their absolute values for each frame; and
    an encoder for encoding the output of said coefficient selector by adaptive transform coding.

2. A speech encoder of an adaptive transform coding system which adaptively encodes an analog speech signal through a block-by-block orthogonal transformation to frequency regions by a discrete cosine transform unit, comprising:
    at least three coefficient selectors supplied with discrete cosine transform coefficients from said discrete cosine transform unit and perform coefficient selection processing following different coefficient selection patterns for each frame;
    a switch for selectively outputting any one of the outputs from said at least three coefficient selectors;
    an optimum pattern selector for mutually comparing the outputs from said at least three coefficient selectors and the output of said discrete cosine transform unit to control said switch so as to select the output of said one of said coefficient selectors which outputs a vector pattern to minimize a quantizing error; and
    an encoder for encoding the output of said switch by adaptive transform coding.

* * * * *